May 12, 1970 H. M. OGLE 3,511,571

METHOD AND APPARATUS FOR COMPARING PATTERNS

Filed Feb. 28, 1966

INVENTOR.
Hugh Malcolm Ogle
BY Flehr & Swain
Attorneys

United States Patent Office 3,511,571

Patented May 12, 1970

3,511,571
METHOD AND APPARATUS FOR COMPARING PATTERNS

Hugh Malcolm Ogle, 70 Jordan Place,
Palo Alto, Calif. 94303

Filed Feb. 28, 1966, Ser. No. 530,537
Int. Cl. G06k *9/08;* G01b *9/08*
U.S. Cl. 356—71 10 Claims

ABSTRACT OF THE DISCLOSURE

A method and apparatus for determining correlation between two patterns, one of which can be a reference fingerprint transparency and the other a fingerprint to be identified. The patterns are optically superimposed and rotated with respect to each other to periodically form collimated light when correlation exists and this light is focused into a correlation spot and detected in its focus plane without regard to its location.

This invention relates to a method and apparatus for comparing patterns such as fingerprints to determine the degree of correlation between them, and is also applicable to other systems wherein the degree of two-dimensional spatial correlation between patterns is to be determined.

Heretofore, the degree of correlation between two patters has been measured automatically by systems in which a point by point comparison between the points of each of the patterns is compared with the help of a digital computer. In general, such a system is too complex and too costly for many applications.

Another technique utilizes transparencies of different scale which are pre-aligned, light being passed through the larger one and the smaller one successively. Consequently, the transmitted light is conically reduced to a spot which is known as a correlation spot. This technique requires a high degree of alignment between the transparencies, requires that their sizes be related by a scale factor that is known, and suffers from a disability that the transparencies cannot be of the same scale. There is, therefore, a need for a new and improved method and apparatus for correlating patterns.

In general, it is an object of the present invention to provide an improved method and apparatus for correlating patterns which will overcome the above mentioned disadvantages.

A further object of the invention is to provide a method and apparatus of the above character in which the patterns having the same scale can be compared.

A further object of the invention is to provide a method and apparatus of the above character in which the output is substantially independent of misalignment between the patterns being compared.

A further object of the invention is to provide a method and apparatus of the above character in which a readily detectable time varying electrical signal is provided as an output, the magnitude of the signal being directly related to the degree of correlation between the patterns being compared.

A further object of the invention is to provide a method and apparatus of the above character in which the measured degree of correlation is compared with a predetermined value to thereby provide a signal indicative of correlation when the predetermined value is exceeded.

A further object of the invention is to provide an apparatus of the above character which is adapted to receive the impression of a finger thereupon, and which compares that fingerprint pattern with a photographic reproduction of a reference fingerprint pattern to determine the degree of correlation therebetween.

Further objects and features of the invention will appear from the following description in which the preferred embodiments of the invention have been set forth in detail in conjunction with the accompanying drawings.

Referring to the drawings.

Figures 1, 2, 3, 4:
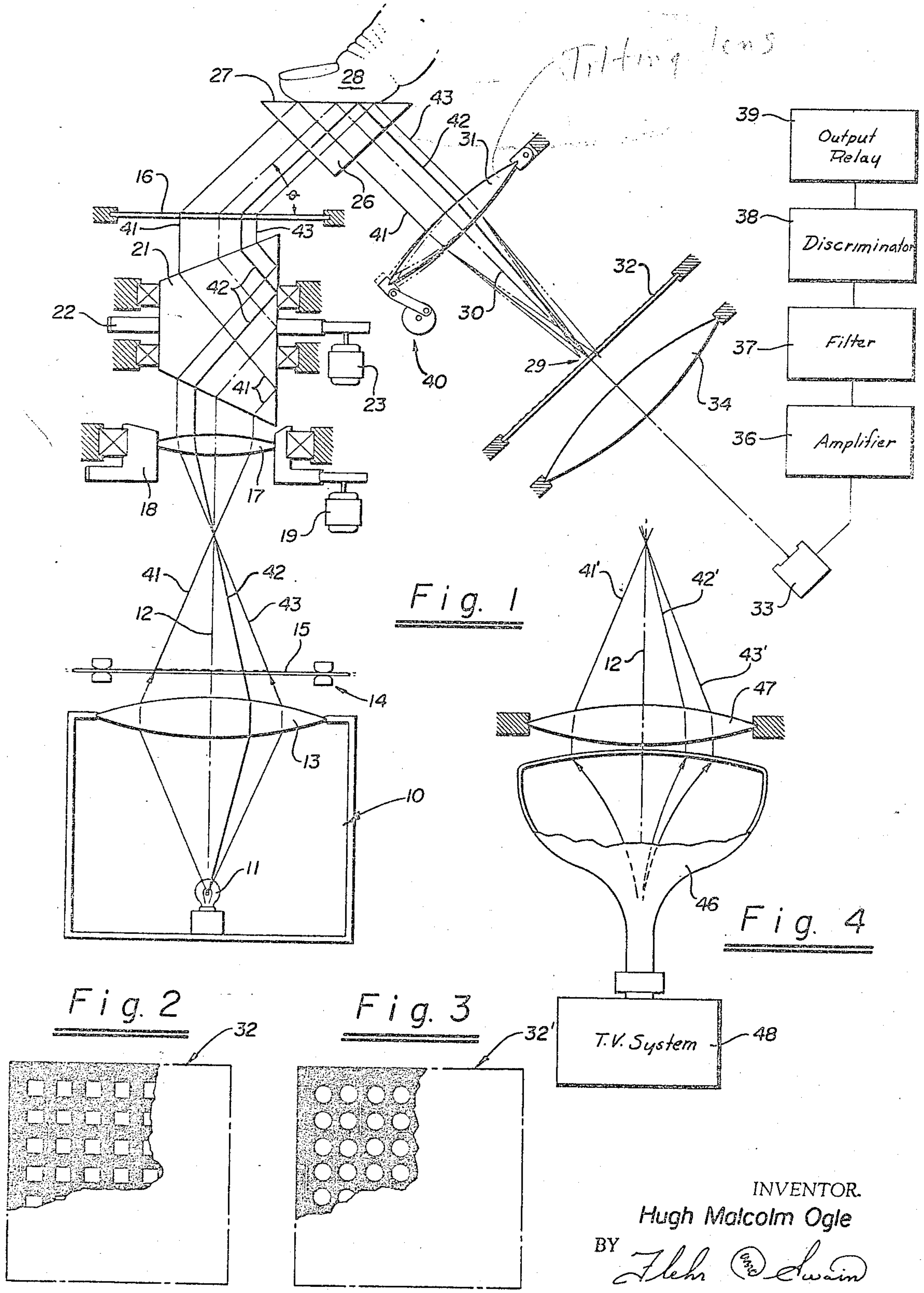
FIG. 1 is a schematic diagram of a fingerprint recognizer constructed according to the invention.
FIG. 2 is a fragmentary plan view of a recognition mask for use in the fingerprint recognizer of FIG. 1.
FIG. 3 is a fragmentary plan view of an alternate construction of a recognition mask for use in the apparatus of FIG. 1.
FIG. 4 is a schematic diagram of a portion of a modified apparatus similar to FIG. 1 in which a television system provides a first reference pattern.

In general, the method and apparatus of the invention utilize an optical computation process for comparing two patterns $P_1$ and $P_2$. First, an optical pattern of diffuse light is created corresponding to the first pattern $P_1$. Light from this optical pattern is interacted with the second pattern $P_2$. The second pattern acts to selectively transmit collimated light from the optical pattern according to the degree of correlation between the patterns $P_1$ and $P_2$. These collimated light rays are focused onto a focal or correlation plane to form a correlation spot. The location of the correlation spot in the plane depends upon the relative position of the two patterns, $P_1$ and $P_2$, with respect to the optic axis of the apparatus.

The presence of the correlation spot is detected without regard to its exact location in the correlation plane. A special transmission mark is placed in the plane so that, depending on its position, the light from the spot is blocked or permitted to pass through to a photocell for sensing the light and converting the same to an electrical signal. The correlation spot is moved in relation to the recognition mask so that the photocell sees interrupted light. If a correlation spot exists, the light transmitted through the mask contains an alternating component or pulses which can be separated by electronic processing methods. If no correlation spot exists, this alternating component does not exist and no alternating component will be detected. Thus, the presence of the correlation spot is determined without knowing the location of the spot in the focal or correlation plane, and images which are displaced laterally with respect to a reference axis are easily detected. The magnitude of the alternating component or pulses indicates the degree of correlation between the patterns $P_1$ and $P_2$.

In order to compensate for rotational displacement, said optical pattern and pattern $P_2$ are continuously rotated with respect to each other so that, when there is correlation, there is a finite amount of time during which rotational alignment of the patterns, $P_1$ and $P_2$, causes collimated rays to be formed.

Referring now in particular to the drawings, there is shown a fingerprint recognizer constructed according to the invention. There is provided a light source 10 which consists of a suitable energized electric lamp 11, the light from which is focused along an optic axis of the system by a condensing lens 13. Means 14 is provided for mounting a reference transparency 15 adjacent the condensing lens 13 in the conventional manner so that light from the source 11 passes through the transparency.

An optical pattern of the transparency 15 is projected on a screen 16 by an objective lens 17. The lens 17 is eccentrically mounted in a mounting 18 which is operatively connected to an electric motor 19 so that the objective lens is rotated about the optic axis 12 by the motor 19 for a purpose to be hereinafter described. A dove prism 21 is disposed intermediate the objective lens 17 and the screen 16. The prism is carried in a mounting 22 operatively connected to an electric motor 23 for rotation. The screen 16 is made of flashed opal glass or other material capable of creating diffusely emanating rays from the pattern.

By this system, the light from the light source 11 is created into an optical pattern of the reference transparency at the screen 16. Rotation of the eccentrically mounted objective lens 17 causes the center of the pattern to describe a circle, and rotation of the dove prism 21 causes the pattern to rotate about its center as it passes about the circle. The screen 16 serves to diffuse the light rays of the pattern so that the pattern is viewable from all directions on the other side of the screen.

Means is provided for receiving a fingerprint from the finger to be recognized and for creating an optical pattern therefrom, which pattern can be used to selectively transmit the light emanating from the screen 16. Such means consists of a 45° reflecting prism 26 operating on a total reflection principle, the reflecting face of the prism adapted to receive the impression of a fingerprint.

The refractive index of the prism 26 is chosen so that the critical condition of total reflection is just achieved for the combination glass and air. Thus, the index of refraction is chosen so that the angle of transmission through the reflecting face 27 just becomes imaginary.

By the law of sines for transmission:

$$n_1 \sin \theta_1 = \sin \theta_2$$

where $n_1$ is index of refraction of prism
$\theta_1$ is angle of reflection $=45°$
$n_2$ is index of refraction of air$=1$
$\theta_2$ is angle of refraction $$n_1 = \frac{\sin \theta_2}{\sin \theta_1}$$

for $\sin \theta_2$ just greater than 1 (i.e., $\theta_2$ imaginary)

$n_1$ is just greater than $\sqrt{2}$, that is to say, the index of refraction of the prism is selected to be just greater than 1.42.

At this initial value, the total reflection condition strongly depends upon the refractive index of the second media, i.e., the media adjacent to the reflecting face. Thus, when a finger 28 is impressed upon the reflecting face of the prism operating at the threshold of the critical index of reflection, the total reflection condition is destroyed at those regions at which the ridges of the fingerprint touch the surface, but is maintained where the troughs of the fingerprint are spaced from the surface.

The surface 27 is used in the above manner to provide an input window for the creation of an optical pattern from the impressed fingerprint. Such a viewing angle is fixed by the reflecting angle of the prism, because of this a distortion corresponding to that viewing angle is incorporated in the view, that is to say, the impressed fingerprint is turned 45° to the view. In order to secure correspondence between the patterns in fingerprints, a similar distortion of the view of the first pattern is incorporated by the arrangement of parts. Thus, the prism receives the light from the optical pattern of the first pattern at the same angle thereto as the angle of reflection. For the 45° prism shown, this angle ($\theta$) is also 45°.

The prism 26 is spaced from the opal glass screen 16 and arranged so that the reflecting face 27 is parallel to the screen and displaced from the optic axis 12 so that the rays proceeding at 45° to the axis 12 and toward the prism are reflected by it. The spacings between the prism and the screen is made about two inches so that adequate collimation is secured when the patterns correlate. The size of the correlation spot 29 formed in later stages is partially determined by this spacing.

If the light from the optical pattern on the glass screen 16 correlates with the selective reflection caused by the fingerprint pressing on the prism, such light will be collimated into parallel rays which leave the prism generally along a second optic axis 30 and impinge upon the fixed lens 31. If there is lack of correlation, light coming from the screen will be absorbed or reflected at random so that significant amounts of such collimated light are not created.

The lens 31 focuses the collimated light into the correlation spot 29 in a correlation plane at which is located a transmission mask 32. The mask 32 may take any of several forms; one form very suitable being a pattern of small equally spaced transparent windows such as shown in FIG. 2. This transmission mask can, for example, be formed by two ruled plates such as Ronchi transmission gratings arranged face to face so that the rulings cross each other to form a vertical-horizontal grid. A pair of Ronchi transmission gratings having 50 lines per inch has been found satisfactory for this application. One satisfactory ruling used vertical and horizontal lines having about one-fourth millimeter line width and one-fourth millimeter line spacing. This ruling was used to detect a correlation spot having an approximate diameter of about .2–.3 millimeter.

The recognition mask acts to interrupt light contained in the correlation spot from passing to a photocell 33. Light passing through the recognition mask is collected by collimating lens 34 so that the photocell receives a chopped light beam which is being turned on and off at a frequency $f=\Omega\pi DL$ where $\Omega$ is the angular speed of the eccentrically mounted lens 17, D is the diameter of the circle traced by the correlation spot, and L is the number of interruptions per inch caused by the pattern of the grating. The angular speed of the eccentrically mounted lens 17 primarily determines the frequency of light as seen by the photocell. Rotation of the dove prism 21 is at a much slower rate so that its effect on the frequency of the light is secondary. It has been found that for rotation speeds of the dove prism of about two to three hundred revolutions per minute, and of the eccentric mounted lens 17 of two to three thousand revolutions per minute that satisfactory outputs are obtained. In general, ratio of the speed of the eccentric lens to the speed of the dove prism should be greater than about three-to-one, and preferably greater than about ten-to-one.

An alternate form of recognition mask is illustrated in FIG. 3. As shown, the mask 32′ is formed by a plurality of circular transmissive areas equally spaced in an otherwise opaque background to form a polka dot pattern. Other forms of recognition pattern, such as a checkerboard pattern, are also suitable. In general, it is preferred that the area of each opaque and transmissive portion of the mask be at least as great or greater than the size of the correlation spot itself so that complete blocking or transmitting of the light from the spot takes place. Obviously, this condition increases the signal to background ratio of the recevied light at the photocell.

Such masks as heretofore described are easily produced by optically reducing a larger physical specimen made according to the above criteria and photographing an image of the same to thereby produce a photographic negative which may be used as the mask. Another way to make the mask is to create a positive photographic plate of a large number of repeated exposures of an actual correlation spot. This can be done using a step and repeat cycle to thereby make a two dimensional array of such exposures. Preferably, the step should be made at least two spot diameters so that an opaque area of at least the size of a transmissive spot area lies inbetween each of them.

The output of the photocell 33 is applied to an amplifier 36 which increases the signal strength and produces a signal of strength proportionate to the amount of light sensed by the photocell. The output of the amplifier is connected to a filter 37 which passes the higher frequency associated with the motion of the lens 17 and blocks the lower frequencies associated with the rotation of the dove prism 21 and other effects. This higher frequency is directly related to the shifting of the correlation spot on the recognition mask. The output of the filter is compared with the predetermined value by a discriminator 38 which is operatively connected to an output relay 39 to energize the samew hen the predtermined value has been exceeded.

As previously mentioned, the size of the correlation spot 24 depends upon the spacing between the optical patterns of the patterns that are being compared. It also depends upon the degree of correlation itself and upon exactness of scale between the optical patterns, such as due to growth or other change in size of the real finger. To eliminate any particular effects from the latter, a slowly varying mechanism 40 is operatively connected to lens 31 to periodically vary the position of the lens 31 along the axis 30, as by a few cycles per minute to thereby vary the position of focus of the correlation spot 29 with respect to the mask 32.

The operation of the fingerprint recognition apparatus is as follows: consider three light rays 41, 42 and 43 emanating from the light source, rays 41 and 43 representing extreme light rays, and light ray 42 representing an intermediate light ray. The rays 41, 43 are focused by condensing lens 13 onto the optic axis 12 and through the transparency positioned just beyond the condensing lens. The rays are gathered by the objective lens, i.e., the eccentrically mounted lens 17, and projected onto the screen 16 after being passed through the dove prism 21. It will be noted that as the rays pass through the dove prism, they are inverted with respect to each other from the position they had before being passed through the prism. Furthermore, it will be noted that they are so reversed by the dove prism not only when the latter is in the position shown in the drawing, but also when it is rotated in position by 180°. Thus, for every rotation of the dove prism, the optical pattern being formed on the screen 16 rotates twice.

Thereafter, portions of each of the rays proceed to the prism 26 for reflection off the input window. Now, considering that rays 41 and 43, for example, represent areas of transmission of the reference transparency, it will be seen that for collimated rays to be formed at the prism 26, such rays must encounter totally reflecting areas thereof, i.e., must encounter the areas of the reflecting surface which are still totally reflecting or are not being touched by the fingerprint. This fact determines the condition that the corresponding portion of the reference transparency must be transparent to the reflecting area of the prism 26 in order to get collimation. In practice, this is a very convenient result inasmuch as the reference transparencies are usually created by making photographic negatives of conventional ink fingerprints. Such fingerprints, of course, have black areas corresponding to the troughs of the print, and white areas corresponding to the ridges, and when inverted as by creating the photographic negative, the troughs become transmissive. Thus, the reference transparency is very easily created from the existing tabulations of fingerprints as are conventionally used.

When the finger 28 being impressed at the input window of the prism corresponds to the fingerprint being displayed on the screen 16 and is angularly aligned therewith, a plurality of collimated rays is produced, i.e., the rays 41, 42 and 43 are permitted to be reflected from the prism face, and are parallel because the scale of the optical pattern formed on the screen 16 is substantially the same as that of the real fingerprint. The optical pattern on the screen 16 is constantly being translated in a circle at a relatively fast rate by the eccentrically mounted lens 17. Thus, as the rays 41–43 leave the prim 26, they angularly precess together about a plurality of cones having apexes at the reflecting face 27. Obviously, this in turn causes the correlation spot to move in a circle on the recognition mask 32 as hereinbefore described.

In order to gain greater flexibility of memory, it may be desired to use closed circuit television for the first pattern. As shown in FIG. 4, a television picture tube 46 is substituted for the light source 11 and reference transparency 15, a condensing lens 47 being used to focus the light rays 41', 42' and 43' from the face of the tube 46 onto the axis 12. By this means, an electronic signal from a television system 48 can be used to rapidly supply a series of reference optical patterns for comparison with the fingerprint impressed upon input window 27.

Although I have disclosed my invention with particular emphasis on its utilization in a fingerprint recognizer, it will be obvious to those skilled in the art that the principles it embodies are applicable to a wide range of problems relating to the determination and measurement of correlation between patterns. The patterns themselves can be of any set of data which is or can be incorporated into a form, which can be interacted with light to form partially transmissive or reflective media corresponding to the set of data. Such optical form may take any of various physical forms, such as one or more partially transparent patterns, partially reflecting surface of their equivalents.

I claim:

1. Apparatus for comparing a reference transparency of a fingerprint with a fingerprint of an individual comprising means for mounting said reference transparency, means for illuminating said transparency and for forming a projection pattern of said transparency at a plane, a translucent screen mounted in said plane, said screen serving to diffusely display said pattern of said reference transparency, a reflecting prism having a first face for totally reflecting light incident thereon from another face, said first face adapted to receive the impression of a fingerprint thereon for partially destroying the total reflection condition according to the pattern of ridges of said impressed fingerprint, said prism arranged with respect to said screen to receive light therefrom for internal reflection upon said reflecting face and to permit said light to impinge upon said reflecting face in such a manner that substantial correlation between the impressed fingerprint and the reference fingerprint causes the light in substantial correlation to be collimated into parallel rays which are permitted to pass out of the prism by reflection, means for focusing said rays onto a recognition image plane to form a correlation spot thereat, the intensity of which is an indication of the degree of correlation between said reference transparency and said fingerprint.

2. Apparatus as in claim 1 further including means for continuously translating the pattern formed at said screen at constant speed so that said correlation spot is translated in said recognition image plane, and means for continuously rotating said pattern while being so translated.

3. Apparatus as in claim 2 in which said means for translating said pattern comprises an eccentric mounting into which said means forming the pattern is mounted, means operatively connected to said eccentric mounting for rotating the same at a constant speed, the center of rotation defining the optic axis of that part of the apparatus.

4. Apparatus as in claim 3 in which said means for rotating said pattern comprises a dove prism, and means operatively connected to said dove prism for rotating the same.

5. Apparatus as in claim 3 in which a partially transmissive mask is disposed at said recognition image plane, said last named means having light transmissive and light blocking portions, each of said portions having dimensions at least as great as the size of the correlation spot, said partially transmissive means serving to chop the light of the correlation spot as it passes about the plane.

6. Apparatus as in claim 5 in which means is positioned to receive the chopped light from said partially transmissive means, and for converting the chopped light into electrical signal pulses, the peak height of which is a measure of the degree of correlation between said reference fingerprint and said impressed fingerprint.

7. Apparatus as in claim 6 in which said means positioned to receive the chopped light includes a photocell for converting the chopped light into electrical signal pulses, amplifier means connected to the output of said photocell for intensifying the power of said pulses, a filter connected to said output of said amplifier for passing the frequency associated with the presence of the correlation spot, a discriminator connected to the output of said filter for comparing the maximum value of said pulses with a predetermined standard, and an output relay for indicating when the level of said pulses exceeds the predetermined standard.

8. Apparatus for comparing a reference transparency of a fingerprint with a fingerprint of an individual comprising means for mounting said reference transparency, means for illuminating said transparency and for forming a projected pattern of said transparency at a plane, a translucent screen mounted in said plane, said screen serving to diffusely display said pattern of said reference transparency, a reflecting prism having a first face for totally reflecting light incident thereon from another face, said first face adapted to receive the impression of a fingerprint thereon for partially destroying the total reflection condition according to the pattern of ridges of said impressed fingerprint, said prism arranged with respect to said screen to receive light therefrom for internal reflection upon said reflecting face and to permit said light to impinge upon said reflecting face in such a manner that correlation between the impressed fingerprint and the reference fingerprint causes the light in substantial correlation to be collimated into parallel rays which are permitted to pass out of the prism by reflection, means for focusing said rays onto a recognition image plane to form a correlation spot thereat, the intensity of which is an indication of the degree of correlation between said reference transparency and said fingerprint means for continuously translating the pattern formed at said screen at constant speed so that said correlation spot is translated in said recognition image plane, said means for translating said pattern comprising an eccentric mounting into which said means forming the pattern is mounted, means operatively connected to said eccentric mounting for rotating the same at a constant speed, the center of rotation defining the optic axis of that part of the apparatus, means for continuously rotating said pattern while being so translated comprising a dove prism, and means operatively connected to said dove prism for rotating the same at a speed of less than about one-third of the speed of said eccentric mounting.

9. Apparatus for comparing a reference transparency of a fingerprint with a fingerprint of an individual comprising means for mounting said reference transparency, means for illuminating said transparency and for forming projection pattern of said transparency at a plane, a translucent screen mounted in said plane, said screen serving to diffusely display said pattern of said reference transparency, a reflecting prism having a first face for totally reflecting light incident thereon from another face, said first face adapted to receive the impression of a fingerprint thereon for partially destroying the total reflection condition according to the pattern of ridges of said impressed fingerprint, said prism arranged with respect to said screen to receive light therefrom for internal reflection upon said reflecting face and to permit said light to impinge upon said reflecting face in such a manner that substantial correlation between the impressed fingerprint and the reference fingerprint causes the light in substantial correlation to be collimated into parallel rays which are permitted to pass out of the prism by reflection, means for focusing said rays onto a recognition image plane to form a correlation spot thereat, the intensity of which is an indication of the degree of correlation between said reference transparency and said fingerprint means for continuously translating the pattern formed at said screen at constant speed so that said correlation spot is translated in said recognition image plane, and means for continuously rotating said pattern while being so translated, said means for translating said pattern comprising an eccentric mounting into which said means forming the pattern is mounted, means operatively connected to said eccentric mounting for rotating the same at a constant speed, the center of rotation defining the optic axis of that part of the apparatus, means for continuously rotating said pattern while being translated, a partially transmissive mask is disposed at said recognition image plane, said last named means having light transmissive and light blocking portions, each of said portions having dimensions at least as great as the size of the correlation spot, said partially transmissive mask being a ruling having equally spaced parallel and perpendicular lines thereon, said partially transmissive mask serving to chop the light of the correlation spot as it passes about the plane.

10. Apparatus for comparing a reference transparency of a fingerprint with a fingerprint of an individual comprising means for mounting said reference transparency, means for illuminating said transparency and for forming a projection pattern of said transparency at a plane, a translucent screen mounted in said plane, said screen serving to diffusely display said pattern of said reference transparency, a reflecting prism having a first face for totally reflecting light incident thereon from another face, said first face adapted to receive the impression of a fingerprint thereon for partially destroying the total reflection condition according to the pattern of ridges of said impressed fingerprint, said prism arranged with respect to said screen to receive light therefrom for internal reflection upon said reflecting face and to permit said light to impinge upon said reflecting face in such a manner that substantial correlation between the impressed fingerprint and the reference fingerprint causes the light in substantial correlation to be collimated into parallel rays which are permitted to pass out of the prism by reflection, means for focusing said rays onto a recognition image plane to form a correlation spot thereat, the intensity of which is an indication of the degree of correlation between said reference transparency and said fingerprint means for continuously translating the pattern formed at said screen at constant speed so that said correlation spot is translated in said recognition image plane, said means for translating said pattern comprising an eccentric mounting into which said means forming the pattern is mounted, means operatively connected to said eccentric mounting for rotating the same at a constant speed, the center of rotation defining the optic axis of that part of the apparatus, means for continuously rotating said pattern while being so translated comprising a dove prism, and means operatively connected to said dove prism for rotating the same, the ratio of the speed of said eccentric mounting to the speed of said dove prism being greater than three-to-one.

References Cited

UNITED STATES PATENTS

| | | | |
|---|---|---|---|
| 1,775,794 | 9/1930 | White | 356—71 |
| 2,646,717 | 7/1953 | Selgin | 88—14 |
| 2,787,188 | 4/1957 | Berger | 88—14 |
| 2,936,607 | 5/1960 | Nielsen | 70—277 |
| 2,952,181 | 9/1960 | Maurer | 356—71 |
| 3,200,701 | 8/1965 | White | 88—14 |
| 3,288,018 | 11/1966 | Belchis et al. | 356—71 |
| 3,324,296 | 6/1967 | Powell | 250—203 |
| 3,350,156 | 10/1967 | Adams | 356—71 |

FOREIGN PATENTS

| | | |
|---|---|---|
| 563,973 | 9/1944 | Great Britain. |

RONALD L. WIBERT, Primary Examiner

J. ROTHENBERG, Assistant Examiner

U.S. Cl. X.R.

356—156, 167